(12) United States Patent
Kajitani et al.

(10) Patent No.: US 8,583,381 B2
(45) Date of Patent: Nov. 12, 2013

(54) ULTRASONIC PROPAGATION TIME MEASUREMENT SYSTEM

(75) Inventors: Hiroshi Kajitani, Tokyo (JP); Junichi Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 429 days.

(21) Appl. No.: 12/922,052

(22) PCT Filed: Apr. 10, 2009

(86) PCT No.: PCT/JP2009/057371
§ 371 (c)(1),
(2), (4) Date: Sep. 10, 2010

(87) PCT Pub. No.: WO2009/125843
PCT Pub. Date: Oct. 15, 2009

(65) Prior Publication Data
US 2011/0015880 A1  Jan. 20, 2011

(30) Foreign Application Priority Data

Apr. 11, 2008  (JP) ................................. 2008-103602

(51) Int. Cl.
*G01B 5/28* (2006.01)

(52) U.S. Cl.
USPC ........................................................ 702/39

(58) Field of Classification Search
USPC ..................... 702/39, 159; 345/157; 310/334
See application file for complete search history.

(56) References Cited

U.S. PATENT DOCUMENTS

| | | |
|---|---|---|
| 4,884,552 A | 12/1989 | Wells et al. |
| 6,118,205 A | 9/2000 | Wood et al. |
| 7,342,350 B2 * | 3/2008 | Toda .............................. 310/334 |
| 7,880,721 B2 * | 2/2011 | Suzuki et al. .................. 345/157 |
| 2003/0144814 A1 * | 7/2003 | Hama et al. .................... 702/159 |

FOREIGN PATENT DOCUMENTS

| | | |
|---|---|---|
| JP | 7-104063 A | 4/1995 |
| JP | 2000307476 A | 11/2000 |
| JP | 2005300504 A | 10/2005 |
| JP | 2006170972 A | 6/2006 |
| JP | 2007179507 A | 7/2007 |

OTHER PUBLICATIONS

International Search Report for PCT/JP2009/057371 mailed Jul. 7, 2009.

H. Kashiwagi, "M-Sequence and Its Applications", Shokodo, Mar. 25, 1996, pp. 1-5, 16-37.

* cited by examiner

*Primary Examiner* — Tung S Lau
*Assistant Examiner* — Xiuquin Sun

(57) ABSTRACT

High-quality and high-speed electronic pen drawing performance is ensured without being affected by noise of an ultrasonic signal which is generated by an apparatus using ultrasonic such as a motion detector. In an ultrasonic receiver for use in ultrasonic propagation time measurement, an external environment noise is measured to first determine a frequency. Thereafter, centered around the frequency, a band elimination filter having a several kHz band is structured as software to again measure an external environment noise. This sequence is repeated until a signal intensity lowers below a predetermined value. When the signal intensity fails to lower below the predetermined value even after a predetermined number of repetitions of the sequence, a transmission output on the side of an electronic pen as an ultrasonic transmission source is increased or an ultrasonic oscillation frequency is changed.

30 Claims, 4 Drawing Sheets

ULTRASONIC PROPAGATION TIME MEASUREMENT SYSTEM

INCORPORATION BY REFERENCE

This application is the National Phase of PCT/JP2009/057371, filed Apr. 10, 2009, which is based upon and claims the benefit of priority from Japanese patent application No. 2008-103602, filed on Apr. 11, 2008, the disclosure of which is incorporated herein in its entirety by reference.

TECHNICAL FIELD

The present invention relates to a method of measuring a propagation time of ultrasonic which leads to a predetermined position from an ultrasonic transmission source and an ultrasonic propagation time measurement system.

BACKGROUND ART

As an example of a related art position detection method using ultrasonic, electronic pen systems are recited in Patent Literature 1 through 3. These position detection systems comprise an electronic pen having a function of transmitting an ultrasonic signal of a fixed waveform and an infrared trigger signal in a fixed cycle and a reception unit which receives two signals transmitted, in which the reception unit specifies a position of the electronic pen from an arrival time point of the trigger signal and an arrival time point of ultrasonic.

Patent Literature 1: U.S. Pat. No. 4,884,552
Patent Literature 2: U.S. Pat. No. 6,118,205
Patent Literature 3: Japanese Patent Laying-Open No. H07-104063
Non-Patent Literature 1: Hiroshi Kashiwagi, "M-Sequence and Its Applications", Mar. 25, 1996, Shokodo.

Measurement of an ultrasonic signal propagation time employs a system structure using a sound wave of a specific frequency which is barely heard, in which when enabling propagation distance measurement on the order of 2 to 3 meters, a frequency around 40 kHz is often used and for further extending a propagation distance, a frequency in proximity to the least audible 25 kHz is used. To the contrary, when a propagation distance is short such as a case, for example, where a range in which a position relationship of the A4 size can be found is sufficient, a frequency in proximity to 80 kHz is used. This is because attenuation in a case where ultrasonic propagates in space is so large that it is difficult to propagate a signal over a distance of several meters by 80 kHz and receive the signal at a sufficient S/N ratio. In addition, because the shorter the distance becomes, the higher position precision is required, it is more likely that a high-frequency signal whose wavelength resolution is small will be used. In recent years, as application of an ultrasonic propagation time measurement technique, more electronic pen systems have been introduced together with a conference/education infrastructure such as a white board and a projector.

While these systems are in general disposed in common offices and schools, in terms of power-saving, security and barrier-free, there is a case where a human body (moving body) sensor (generally called motion detector) is at the same time disposed for automatically turning on/off lighting. Although the sensors in general use infrared in many cases, its single use might cause erroneous operation, so that moving body sensing which makes use of the Doppler shift of ultrasonic has been used together. Since an intensity of ultrasonic used here which is transmitted from the side of a motion detector is far larger than that used in an electronic pen system, when an ultrasonic frequency used in the motion detector and an ultrasonic frequency used in the electronic pen system coincide with each other, the electronic pen system will determine that fixed ultrasonic is constantly transmitted, resulting in having a position of the electronic pen be constantly fixed to prevent normal drawing.

In addition, also in a case where ultrasonic frequencies are different from each other, since a system which in particular transmits and receives ultrasonic modulated based on a pseudo random signal requires a reception unit side to have a large frequency band to cause noise, normal drawing is prevented.

An object of the present invention is to selectively remove an ultrasonic signal transmitted from a motion detector or the like which will be noise to maintain normal operation of an electric pen system or the like when an ultrasonic frequency used in an apparatus using ultrasonic such as a motion detector and an ultrasonic frequency used in an ultrasonic propagation time measurement system such as an electronic pen system are close to each other.

SUMMARY

According to an exemplary aspect of the invention, an ultrasonic propagation time measurement system includes an electromagnetic wave transmission unit which sends out an electromagnetic wave signal indicative of transmission timing, a unit which generates an ultrasonic driving signal by modulating ultrasonic based on a pseudo random signal whose self-correlativity is high simultaneously with sending of said electromagnetic wave signal, an ultrasonic transmission unit which sends out an ultrasonic signal driven by the ultrasonic driving signal, an electromagnetic wave reception unit which detects said electromagnetic wave signal, an ultrasonic reception unit including an ultrasonic detection unit which detects said ultrasonic signal sent, an amplification unit for a signal detected by said ultrasonic detection unit, a filtering unit for a signal passed through said amplification unit and a unit which converts a signal passed through said filtering unit into a digital signal, a frequency determination unit having an FFT or equivalent function for a digital signal generated by said ultrasonic reception unit, a band attenuation filtering unit which attenuates, centered around a digital signal frequency determined by said frequency determination unit, only a frequency band determined in advance by attenuation determined in advance, and a data processing unit which calculates, with the same waveform as a waveform of said ultrasonic driving signal as a model waveform, a value of correlation between a detected ultrasonic signal and the model waveform and detects a main peak of the calculated correlation value to calculate an ultrasonic propagation time from a time of detection of said electromagnetic wave signal and a time point of detection of the Main peak.

In an ultrasonic propagation time measurement system using an ultrasonic signal modulated by using M-sequence data, the present invention enables measurement of a frequency and an intensity of an ultrasonic signal which will be external environment noise within a predetermined frequency range without provision of a dedicated receiver and furthermore enables automatic structuring of an attenuation filter capable of selectively removing an ultrasonic signal which will be noise, resulting in realizing high-speed ultrasonic propagation time measurement with high precision at low costs.

EXEMPLARY EMBODIMENT

Figure 1:
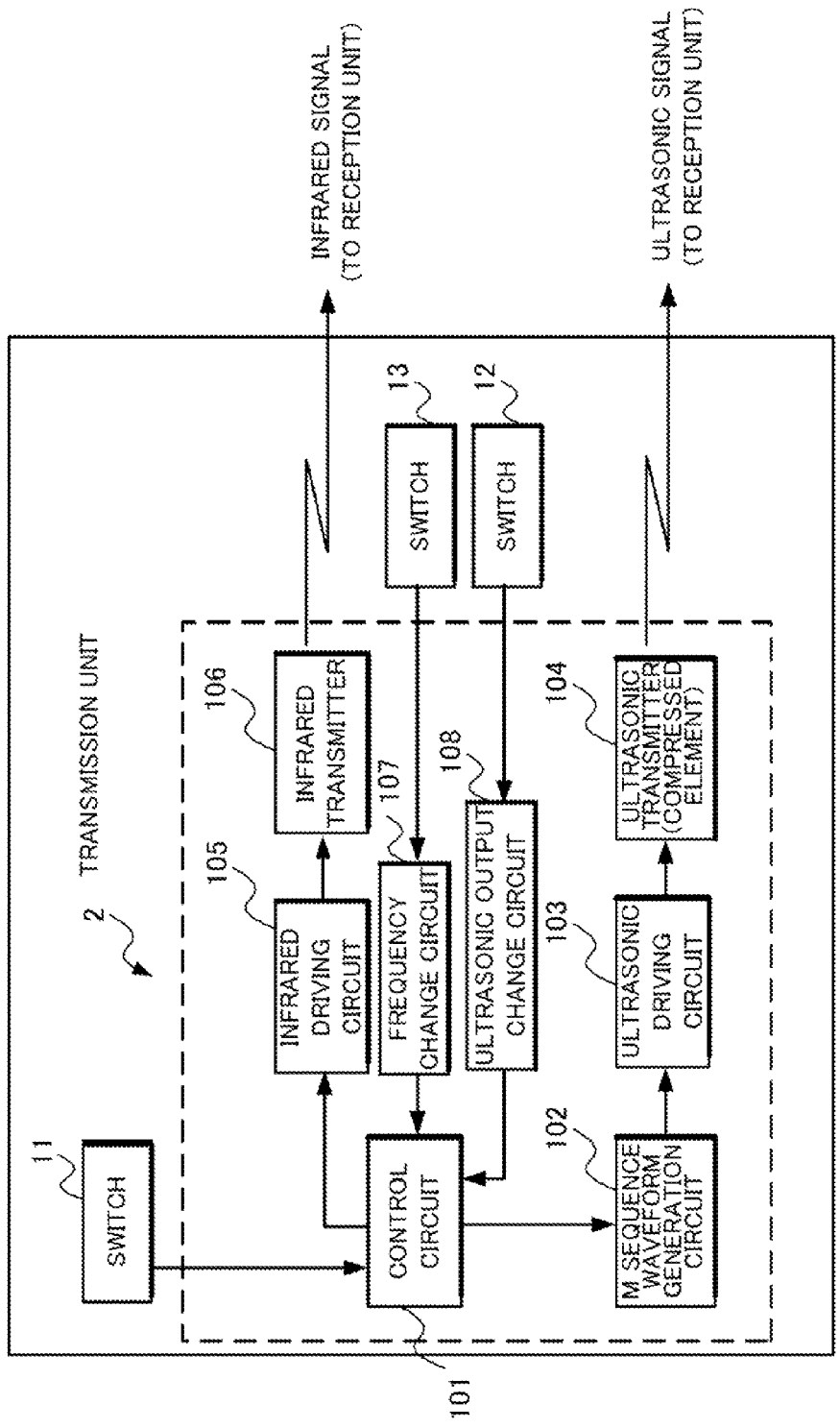
FIG. 1 is a structural diagram of a transmission unit 2 in an ultrasonic propagation time measurement system according to the present invention.
Figure 2:
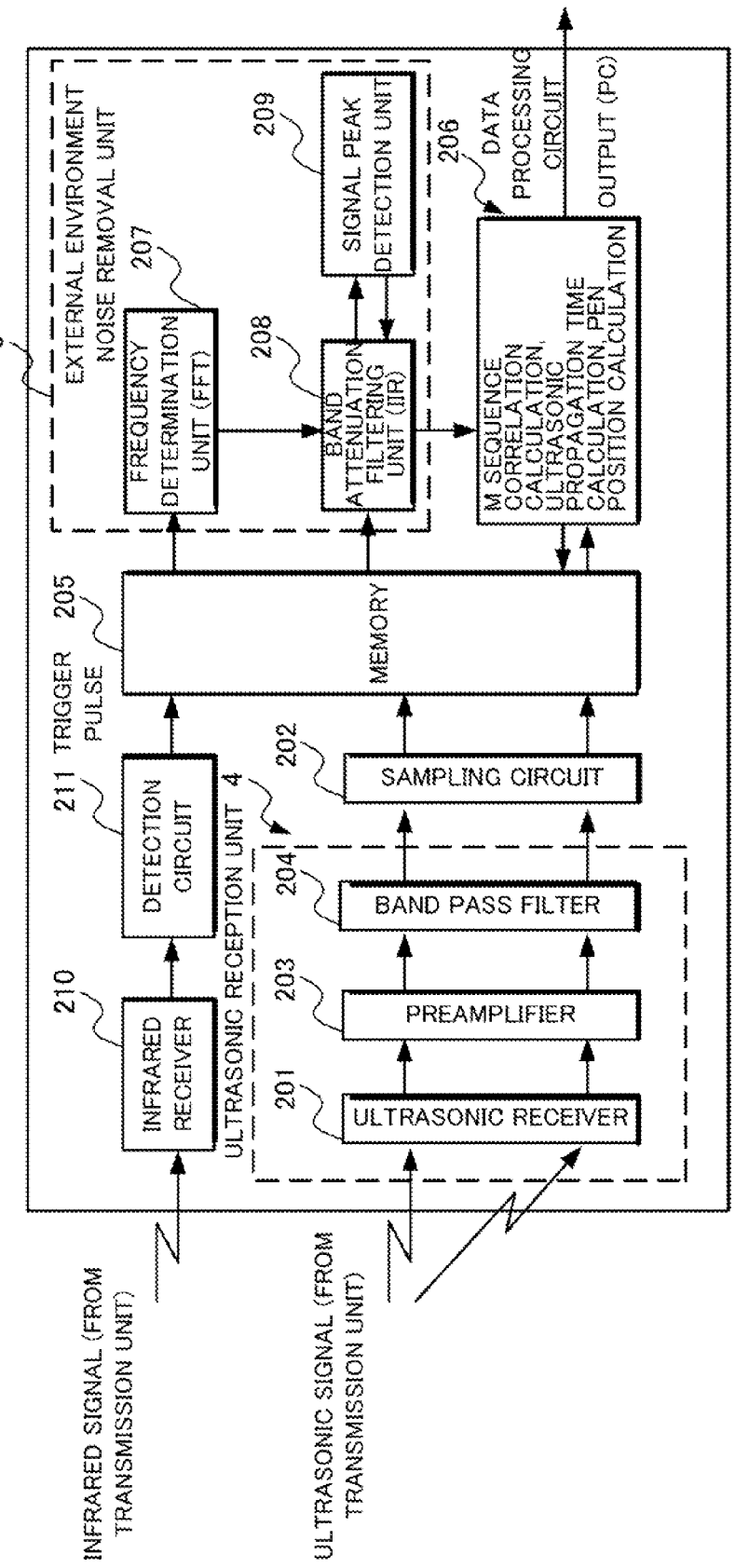
FIG. 2 is a structural diagram of a reception unit 3 in the ultrasonic propagation time measurement system according to the present invention.

Next, a best mode for implementing the present invention will be described in detail with respect to an electronic pen system as an example with reference to FIG. 1 through FIG. 4. FIGS. 1 and 2 show an electronic pen system using an ultrasonic position measurement system according to the present invention. The system comprises a transmission unit 2 attached to an electronic pen 1 having a trigger signal and ultrasonic signal generation switch 11, an ultrasonic signal output change switch 12 and an ultrasonic frequency change switch 13, and a reception unit 3 disposed at a predetermined position apart from the transmission unit. The transmission unit 2 comprises a control circuit 101, an M sequence bit string storage memory 102, an ultrasonic driving circuit 103, an ultrasonic transmitter (piezoelectric element or magneto-strictive element) 104, an infrared driving circuit 105, an infrared transmitter 106, an ultrasonic transmission output change circuit 107 and an ultrasonic frequency change circuit 108.

Figure 3:
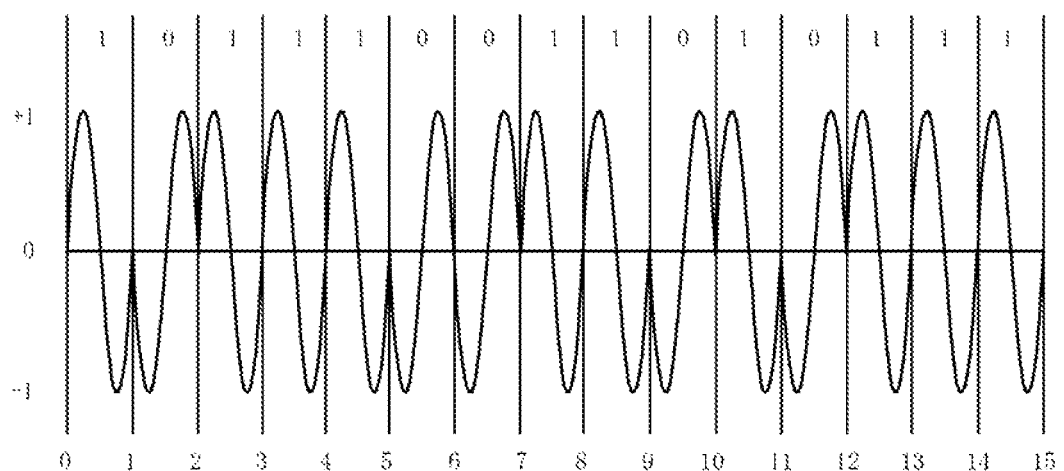
FIG. 3 is a waveform diagram of an ultrasonic driving signal whose phase is modulated by M sequence data.
Figure 4:
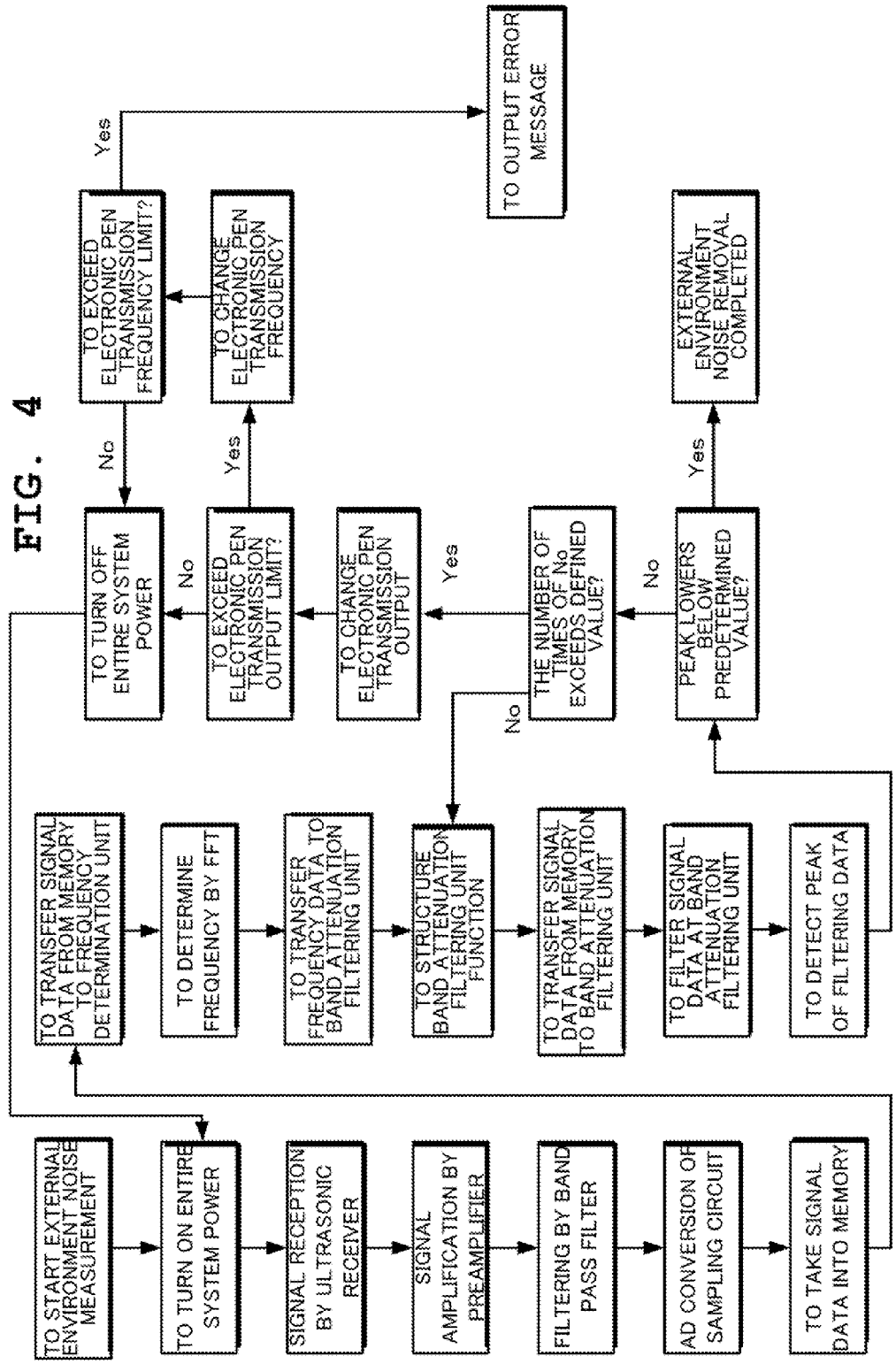
FIG. 4 is a diagram showing an example of a basic function flow of external environment noise removal according to the present invention.

The M sequence generation circuit 102 generates an M sequence determined by a characteristic polynomial determined based on an M sequence initial condition supplied from the control circuit 101. The M sequence generation circuit 102, which has a 4-bit shift register having property of, for example, quartic characteristic polynomial $f(x)=x^4+x+1$ or $f(x)=x^4+x^3+1$, generates a bit string whose sequence length is 15 bits. By changing a 4-bit initial condition, 15 different data whose data arrangement is cyclically shifted is obtained. FIG. 3 shows an example of an ultrasonic waveform whose phase is modulated by an M sequence. Each one bit of 15-bit M sequence data "000100110101111" is set to correspond to one cycle of a basic wave. "0" is assumed to have an inverted phase and "1" is assumed to have a forward phase and a modulated wave will have a length equivalent to 15 cycles of the basic wave. Details of an M sequence are described in, for example, Hiroshi Kashiwagi, "M-sequence and Its Applications" (Mar. 25, 1996, Shokodo).

When the switch 11 that the electronic pen 1 has is pressed, the control circuit 101 first supplies the infrared driving circuit 105 and the M sequence generation circuit 102 with a trigger signal as a reference of time measurement and M sequence 4-bit initial condition data. The infrared driving circuit 105 generates an infrared driving signal based on the signal from the control circuit 101. The infrared transmitter 106 is driven by the output of the infrared driving circuit 105 to send infrared into space through the electronic pen 1.

On the other hand, the M sequence generation circuit 102 generates an M sequence bit string based on the initial condition supplied from the control circuit 101 and supplies the same to the ultrasonic driving circuit 103. The ultrasonic driving circuit 103 phase-modulates the ultrasonic signal by the M sequence and supplies the obtained signal as an ultrasonic driving signal to the ultrasonic transmitter 104. The ultrasonic transmitter 104 is driven by the driving signal to send the M-sequence phase-modulated ultrasonic signal into space in synchronization with transmission timing of the infrared transmitter 106. Accordingly, the infrared signal and the ultrasonic signal are simultaneously emitted directed to the reception unit from the electronic pen. For functioning as an electronic pen in practice, the foregoing operation will be repeated in a fixed cycle while the switch is being pressed.

Since the control circuit 101 is formed of a CPU or the like, each signal waveform often has a rectangular form. As to an infrared trigger signal as a reference of time measurement, it preferably has a waveform as rectangular as possible in order to reduce a time gap in sampling on the receiver side and minimize a measurement error. As to an ultrasonic signal, since the ultrasonic transmitter 104 is formed of a piezoelectric element (or magneto-strictive element) in many cases and the piezoelectric element itself includes L and C components, ultrasonic sent out into space will have a pseudo sine wave even when a driving waveform has a rectangular shape. As to waveforms on the transmission side, no problem will occur even when they are a sine wave, a rectangular wave, chopping wave and a trapezoidal wave taking properties of the transmitter into consideration.

The reception unit 3 comprises an ultrasonic receiver (piezoelectric element or a magneto-strictive element or a capacitor microphone) 201, a sampling circuit 202, an infrared receiver 210, a detection circuit 211, a memory 205 and a data processing circuit 206.

The ultrasonic receiver (piezoelectric element or a magneto-strictive element or a capacitor microphone) 201 receives an ultrasonic signal transmitted from the electric pen 1 and converts the same into an electric signal. The sampling circuit 202 samples the ultrasonic signal at fixed intervals and stores the same as phase-modulated M sequence ultrasonic data into the memory 205.

The infrared receiver 210 receives the infrared signal from the electronic pen 1 and converts the same into an electric signal. Upon detecting a trigger pulse from the output of the infrared receiver 210, the detection circuit 211 stores an arrival time of the trigger pulse into the memory 205. Upon detecting M sequence initial condition data, the detection circuit 211 stores the same into the memory 205.

In place of including an M sequence initial condition in an infrared signal, a phase-modulated M sequence ultrasonic model waveform generated in advance based on a predetermined M sequence initial condition may be stored in the memory 205 and upon arrival of an infrared trigger signal, the data processing unit 206 may read the M sequence model waveform.

Upon reading data indicative of trigger pulse arrival from the memory 205, the data processing circuit 206 generates an M sequence model waveform from the stored M sequence initial data and further phase-modulates the model waveform by ultrasonic similarly in the transmission unit 2 to generate a phase-modulated ultrasonic M sequence model waveform whose waveform is the same as the ultrasonic driving signal on the transmission side. The data processing circuit 206 executes correlation processing between the phase-modulated ultrasonic model waveform and the phase-modulated ultrasonic reception waveform stored in the memory 205. Upon detecting a first peak of a correlation value, the data processing circuit 206 calculates an elapsed time from the trigger pulse arrival time until a time point of detection of the correlation value peak, that is, a time of propagation of an ultrasonic signal from the electronic pen 1 to the reception unit 3.

More specifically, set the trigger detection time stored in the memory 205 to be the sampling start time (t) and read the phase-modulated M sequence ultrasonic data from the memory 250 to calculate a correlation value C(t) at the sampling start time (t) based on Numerical Expression (1)

between the read data and the previously generated phase-modulated M sequence ultrasonic model waveform.

(NUMERICAL EXPRESSION 1)

$$C(t) = \frac{1}{N} \sum_{i=0}^{N-1} r(i) f(i+t) \quad (1)$$

In the Expression (1), "i" is an integral value which represents a sampling time variable, "N" represents the number of samplings of a model waveform, "r(i)" represents a value of a model waveform at a sampling time i and "f(i+t)" represents a value of a reception waveform at a sampling time (i+t).

Next, search a peak from the obtained correlation value. Unless a peak is detected, increment the sampling start time (t) by a unit time of I and similarly repeat peak search. When a correlation peak is detected, read a sampling time corresponding to a variable t at a time of detection of the correlation peak from the memory 205. Lastly, the data processing circuit 206 calculates a time of propagation of the ultrasonic from the electronic pen 1 to the reception unit 3 based on the trigger detection time and the peak detection time. With a sampling time when an infrared trigger pulse is received set to be 0 and a sampling cycle set to be DT, an ultrasonic propagation time can be calculated as t×DT.

When such an ultrasonic propagation time measurement system as described above is actually operated, there is a case, for example, where a sensor using ultrasonic such as a motion detector is disposed adjacent to the system. Intensity of a signal transmitted from the motion detector or the like is extremely large (it might be 10000 times), so that it can be recognized as enormously large noise for the ultrasonic propagation time measurement system. In the system of the present invention which executes transmission and reception of a signal whose phase is modulated by M sequence data, in particular, because a frequency band on the side of the ultrasonic reception side is wide, there might exist numerous ultrasonic signals which will be noise at different frequencies, so that it is difficult to execute normal measurement without modification. Therefore, executing an external environment noise removal sequence as will be described in the following realizes normal operation of ultrasonic propagation time measurement.

Next, an actual external environment noise removal sequence will be described in the following. First, after the power of the entire system is turned on to complete system stand-by, start external environment noise measurement by the ultrasonic receiver. When the system is connected to a PC or the like, it is possible to execute control by an external environment noise measurement application on the PC side. The external environment noise measurement is executed by at least two channels in which an analog signal passed through a receiver, an amplifier and a band pass filter is sampled by an AD converter and converted into digital data which will be stored in a memory.

Thereafter, execute frequency analysis at a frequency determination unit 207 by using data stored in the memory. Since signals are all digitized, it is possible to execute FFT or determine a frequency by averaging a cycle at a zero-cross point as a simple manner.

Next, form a band attenuation filter for this frequency. As a digital filter, common are an FIR (Finite Impulse Response) filter and an IIR (Infinite Impulse Response) filter, and although the FIR filter is used when placing importance on stability and the IIR filter is used when mitigating a system load, both of the filters can be used in either case.

After setting various parameters to have a filter having predetermined attenuation and frequency band, filter the data stored in the memory, search a peak of the obtained data and unless values in both the two channels fall within a predetermined range (e.g. within 1% of an AD conversion range), repeatedly change the attenuation of the filter again to compress an external environment noise and when the signal enters the predetermined range, end the external environment noise removal sequence. When many ultrasonic signals which will be noise exist at different frequencies, execute the above sequence starting with a frequency component whose gain is the largest in frequency analysis such as FFT.

Even when the external environment noise removal sequence set forth in the foregoing is executed, there will be a case where a noise signal output is so large that it is impossible to suppress a noise signal to be not more than a defined value. At this time, adding operation of increasing an output to the ultrasonic output variable unit 12 in the electronic pen 1 enables a relative S/N ratio to be improved to suppress the noise signal to be not more than the defined value. When even such addition still fails to suppress the noise signal to be not more than the defined value, the ultrasonic frequency change unit 13 changes an ultrasonic driving frequency to execute external environment noise removal sequence again.

Although the present invention has been described with respect to the preferred mode of implementation and exemplary embodiment in the foregoing, the present invention is not necessarily limited to the above-described mode of implementation and exemplary embodiment and can be implemented in various modifications without departing from the scope of its technical idea.

What is claimed is:

1. An ultrasonic propagation time measurement system, comprising:
    an electromagnetic wave transmission unit which sends out an electromagnetic wave signal indicative of transmission timing;
    a unit which generates an ultrasonic driving signal by modulating ultrasonic based on a pseudo random signal whose self-correlativity is high simultaneously with sending of said electromagnetic wave signal;
    an ultrasonic transmission unit which sends out an ultrasonic signal driven by the ultrasonic driving signal;
    an electromagnetic wave reception unit which detects said electromagnetic wave signal;
    an ultrasonic reception unit including an ultrasonic detection unit which detects said ultrasonic signal sent, an amplification unit for a signal detected by said ultrasonic detection unit, a filtering unit for a signal passed through said amplification unit and a unit which converts a signal passed through said filtering unit into a digital signal;
    a frequency determination unit having an FFT or equivalent function for a digital signal generated by said ultrasonic reception unit;
    a band attenuation filtering unit which attenuates, centered around a digital signal frequency determined by said frequency determination unit, only a frequency band of a detected ultrasonic signal determined in advance by attenuation determined in advance; and
    a data processing unit which calculates, with the same waveform as a waveform of said ultrasonic driving signal as a model waveform, a value of correlation between an ultrasonic signal outputted from said band attenuation filtering unit and the model waveform and detects a main peak of the calculated correlation value to calculate an ultrasonic propagation time from a time of detection of said electromagnetic wave signal and a time point of detection of the main peak.

2. The ultrasonic propagation time measurement system according to claim 1, wherein to said phase-modulated ultrasonic driving signal, M cycle (integer of M≥1) of ultrasonic is assigned per one bit of the pseudo random signal.

3. The ultrasonic propagation time measurement system according to claim 1, wherein said ultrasonic driving signal generation unit phase-modulates said ultrasonic.

4. The ultrasonic propagation time measurement system according to claim 1, wherein said pseudo random signal is M sequence data.

5. The ultrasonic propagation time measurement system according to claim 1, wherein with the same waveform as a waveform of a signal obtained after said ultrasonic driving signal has passed through said band attenuation filtering unit as a model waveform, said data processing unit calculates a value of correlation between a detected ultrasonic signal and the model waveform and detects a main peak of the calculated correlation value to calculate an ultrasonic propagation time from a time point of detection of said electromagnetic wave signal and a time of detection of the main peak.

6. The ultrasonic propagation time measurement system according to claim 1, wherein said electromagnetic wave signal is infrared.

7. The ultrasonic propagation time measurement system according to claim 1, wherein said ultrasonic transmission unit is formed of a piezoelectric or magneto-strictive element which has a resonance point at a frequency that is substantially an even-numbered multiple of a frequency of said ultrasonic driving signal and which is driven by the ultrasonic driving signal to send out an ultrasonic signal.

8. The ultrasonic propagation time measurement system according to claim 1, wherein said ultrasonic transmission unit has a transmission signal output variable.

9. The ultrasonic propagation time measurement system according to claim 1, wherein said ultrasonic transmission unit has a transmission signal frequency variable.

10. The ultrasonic propagation time measurement system according to claim 1, wherein said ultrasonic reception unit has a frequency band equal to or higher than a frequency of said ultrasonic driving signal.

11. The ultrasonic propagation time measurement system according to claim 10, wherein said ultrasonic reception unit has a frequency band up to an even-numbered multiple of the frequency of said ultrasonic driving signal.

12. The ultrasonic propagation time measurement system according to claim 1, wherein said ultrasonic transmission unit is mounted on a movable body.

13. The ultrasonic propagation time measurement system according to claim 12, wherein said movable body is an electronic pen.

14. The ultrasonic propagation time measurement system according to claim 12, wherein said movable body is a robot.

15. The ultrasonic propagation time measurement system according to claim 1, wherein said ultrasonic detection unit is formed of a piezoelectric or magneto-strictive element.

16. An ultrasonic propagation time measurement method, comprising:
by an electromagnetic wave transmission unit, an electromagnetic wave transmission step of sending out an electromagnetic wave signal indicative of transmission timing;
by an ultrasonic driving signal generation unit, a step of generating an ultrasonic driving signal by modulating ultrasonic based on a pseudo random signal whose self-correlativity is high simultaneously with sending of said electromagnetic wave signal;
by an ultrasonic transmission unit, an ultrasonic transmission step of sending out an ultrasonic signal driven by the ultrasonic driving signal;
by an electromagnetic wave reception unit, an electromagnetic wave reception step of detecting said electromagnetic wave signal;
by an ultrasonic reception unit, an ultrasonic reception step including the ultrasonic detection step of detecting said ultrasonic signal sent, the amplification step of amplifying a signal detected at said ultrasonic detection step, the filtering step of filtering a signal passed through said amplification step and the step of converting a signal passed through said filtering step into a digital signal;
by a frequency determination unit, a frequency determination step having an FFT or equivalent function for a digital signal generated by said ultrasonic reception unit;
by a band attenuation filtering unit, a band attenuation filtering step of attenuating, centered around a digital signal frequency determined at said frequency determination step, only a frequency band of a detected ultrasonic signal determined in advance by attenuation determined in advance; and
by a data processing unit, a data processing step of calculating, with the same waveform as a waveform of said ultrasonic driving signal as a model waveform, a value of correlation between an ultrasonic signal outputted from said band attenuation filtering unit and the model waveform and detecting a main peak of the calculated correlation value to calculate an ultrasonic propagation time from a time of detection of said electromagnetic wave signal and a time point of detection of the main peak.

17. The ultrasonic propagation time measurement method according to claim 16, wherein to said phase-modulated ultrasonic driving signal, M cycle (integer of M≥1) of ultrasonic is assigned per one bit of the pseudo random signal.

18. The ultrasonic propagation time measurement method according to claim 16, wherein at said ultrasonic driving signal generation step, said ultrasonic is phase-modulated.

19. The ultrasonic propagation time measurement method according to claim 16, wherein said pseudo random signal is M sequence data.

20. The ultrasonic propagation time measurement method according to claim 16, wherein at said data processing step, with the same waveform as a waveform of a signal obtained after said ultrasonic driving signal has passed through said band attenuation filtering step as a model waveform, a value of correlation between a detected ultrasonic signal and the model waveform is calculated to detect a main peak of the calculated correlation value and calculate an ultrasonic propagation time from a time point of detection of said electromagnetic wave signal and a time of detection of the main peak.

21. The ultrasonic propagation time measurement method according to claim 16, wherein said electromagnetic wave signal is infrared.

22. The ultrasonic propagation time measurement method according to claim 16, wherein at said ultrasonic transmission step, an ultrasonic signal is sent out by a piezoelectric or magneto-strictive element which has a resonance point at a frequency that is substantially an even-numbered multiple of a frequency of said ultrasonic driving signal and which is driven by the ultrasonic driving signal.

23. The ultrasonic propagation time measurement method according to claim 16, wherein at said ultrasonic transmission step, a transmission signal output is set to be variable.

24. The ultrasonic propagation time measurement method according to claim 16, wherein at said ultrasonic transmission step, a transmission signal frequency is set to be variable.

25. The ultrasonic propagation time measurement method according to claim 16, wherein at said ultrasonic reception step, a frequency band equal to or higher than a frequency of said ultrasonic driving signal is provided.

26. The ultrasonic propagation time measurement method according to claim 25, wherein at said ultrasonic reception step, a frequency band up to an even-numbered multiple of the frequency of said ultrasonic driving signal is provided.

27. The ultrasonic propagation time measurement method according to claim 16, wherein said ultrasonic transmission step is executed by a movable body.

28. The ultrasonic propagation time measurement method according to claim 27, wherein said movable body is an electronic pen.

29. The ultrasonic propagation time measurement method according to claim 27, wherein said movable body is a robot.

30. The ultrasonic propagation time measurement method according to claim 16, wherein at said ultrasonic detection step, said ultrasonic signal is detected by an ultrasonic detection element formed of a piezoelectric or magneto-strictive element.

* * * * *